(12) United States Patent
Berke et al.

(10) Patent No.: US 9,443,115 B2
(45) Date of Patent: Sep. 13, 2016

(54) SYSTEM AND METHOD FOR CIRCUIT CARD INSERTION TRACKING

(71) Applicant: Dell Products, L.P., Round Rock, TX (US)

(72) Inventors: Stuart A. Berke, Austin, TX (US); Sandor Farkas, Round Rock, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 68 days.

(21) Appl. No.: 14/340,895

(22) Filed: Jul. 25, 2014

(65) Prior Publication Data

US 2016/0028404 A1    Jan. 28, 2016

(51) Int. Cl.
*G06F 21/85* (2013.01)

(52) U.S. Cl.
CPC .................... *G06F 21/85* (2013.01)

(58) Field of Classification Search
CPC ................. G06F 21/85; G06F 21/88
See application file for complete search history.

(56) References Cited

U.S. PATENT DOCUMENTS

| | | | | |
|---|---|---|---|---|
| 4,553,252 A * | 11/1985 | Egendorf | ........... | G11B 23/0875 377/15 |
| 5,563,396 A * | 10/1996 | Wakui | ........... | G06K 13/08 235/441 |
| 6,883,125 B2 * | 4/2005 | Abbondanzio | ........ | G06F 21/86 702/127 |
| 7,321,313 B1 * | 1/2008 | Inlow | ........... | H01R 13/641 340/654 |
| 7,770,048 B2 * | 8/2010 | Aksamit | ........... | G07C 3/10 377/15 |
| 7,962,383 B2 * | 6/2011 | Egendorf | ........... | G06Q 20/20 340/309.16 |
| 8,006,894 B1 * | 8/2011 | Rouverol | ........... | G07C 13/00 235/386 |
| 8,903,683 B2 * | 12/2014 | Shilo | ........... | G06F 11/0745 377/16 |
| 2008/0155681 A1 * | 6/2008 | Mukouchi | ........... | G06F 21/35 726/17 |
| 2009/0222300 A1 * | 9/2009 | Guith | ........... | G06Q 30/02 705/35 |
| 2012/0051490 A1 * | 3/2012 | Hussain | ........... | G06F 21/86 377/15 |
| 2013/0238118 A1 * | 9/2013 | Haas | ........... | G07F 11/00 700/231 |
| 2014/0082504 A1 * | 3/2014 | Stanton | ........... | G09G 5/003 715/738 |

* cited by examiner

*Primary Examiner* — Thomas J Hiltunen

(74) *Attorney, Agent, or Firm* — Fogarty, L.L.C.

(57) ABSTRACT

Embodiments of systems and methods for circuit card insertion tracking are described. In an embodiment, a method may include detecting insertion of a pluggable circuit card into a socket connector, and incrementing a count of insertions in an insertion counter.

14 Claims, 8 Drawing Sheets

SYSTEM AND METHOD FOR CIRCUIT CARD INSERTION TRACKING

FIELD

This disclosure relates generally to computer systems, and more specifically, to systems and methods for circuit card insertion tracking.

BACKGROUND

In general, Information Handling Systems (IHS) include a processing device, a memory device for storing computer code that, when executed by the processor, causes the IHS to perform various operations on data and a data storage device for storing the data. Memory devices are often configured on a circuit card, often referred to as a Dual In-line Memory Module (DIMM). The IHS often includes various other pluggable circuit cards, such as Peripheral Component Interconnect (PCI) cards, etc. Pluggable circuit cards, such as DIMM cards and PCI cards, generally plug into a connector slot or socket. The connector slot typically includes several metal connectors for contacting corresponding connector pads on the circuit card.

Pluggable circuit cards and corresponding insertion sockets or slots are typically rated for limited durability. Durability is typically rated by the number of card insertion cycles. For example, a standard DIMM socket may be designed to support full performance for up to twenty-five (25) DIMM insertion cycles. After that point, it is not guaranteed that the mechanical, electrical, and other properties will be met. Examples of specifications parameters that will be at risk are: Insertion Force, Retention Force, Un-mating Force, Contact Resistance, Current Carrying Capability, Signal Loop Inductance, Signal Capacitance, Random Vibration Tolerance, Physical Shock Tolerance, and others. When any of these parameters exceeds their specified operating range requirements due to excessive numbers of insertion cycles, intermittent or persistent memory errors could occur.

In addition, the industry is constantly looking to reduce the cost of both the connector sockets as well as the DIMM modules by reducing the thickness of plating on electrical contacts. Alternatively, costs may be lowered by using lower cost plating material, contacts, gold flash, etc. For example, DDR3 DIMM modules have plating recommendations for gold plating 0.76 micrometers over 2.0 micrometers nickel, or gold plating 0.05 micrometers over 0.25 micrometers palladium over 2.0 micrometers nickel, or gold plating 0.05 micrometers over 2.0 micrometers nickel depending on the application. But suppliers are constantly pushing industry standards to use thinner and less costly options.

Over the typical 5-10 year life of a server, pluggable circuit cards, such as DIMMs, may be moved, replaced, swapped, upgraded many times. This is particularly the case if the system is used for product development, is repurposed or reconfigured frequently, or exhibits memory related failures or system failures which implicate possible memory failures. However there is no mechanism to determine or track how many times a pluggable circuit card or connector socket has been inserted or removed.

SUMMARY

Embodiments of systems and methods for circuit card insertion tracking are described. In an embodiment, a method may include detecting insertion of a pluggable circuit card into a socket connector, and incrementing a count of insertions in an insertion counter.

In a further embodiment, the method may include detecting insertion of the pluggable circuit card into the socket connector without external power being provided to either the pluggable circuit card or the socket connector. The method may also include detecting insertion is performed by a mechanical detection device. In another embodiment, the method may include providing a dedicated power source for detecting insertion and incrementing the counter. In such an embodiment, the dedicated power source may be a coin-cell battery. In another embodiment, the dedicated power source is an electro-mechanical power source.

In an embodiment, the method may also include detecting that the socket connector is powered at the time that the pluggable circuit card is inserted into the socket connector. The method may also include recording an identifier of the pluggable circuit card inserted into the socket connector. Additionally, the method may include logging data associated with insertion of the pluggable circuit card into the socket connector in a system log. Also, the method may include communicating data associated with insertion of the pluggable circuit card into the socket connector to a third party.

An Information Handling System (IHS) is presented. In an embodiment, the IHS includes an insertion detector configured to detect insertion of a pluggable circuit card into a socket connector. The system may also include an insertion counter coupled to the insertion detector and configured to increment a count of insertions.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

The present embodiments describe methods and systems for tracking the number of times a pluggable circuit card is inserted/removed from a socket connector, providing counts, thresholds, and user/service warnings for each individual pluggable circuit card, and each socket connector on a board. Several example embodiments are described with different embodiments which may be implemented separately or jointly. In some embodiments, the pluggable circuit card may be a DIMM module. One of ordinary skill will recognize, however, that the present embodiments are not limited to use with DIMM modules.

Figure 1:
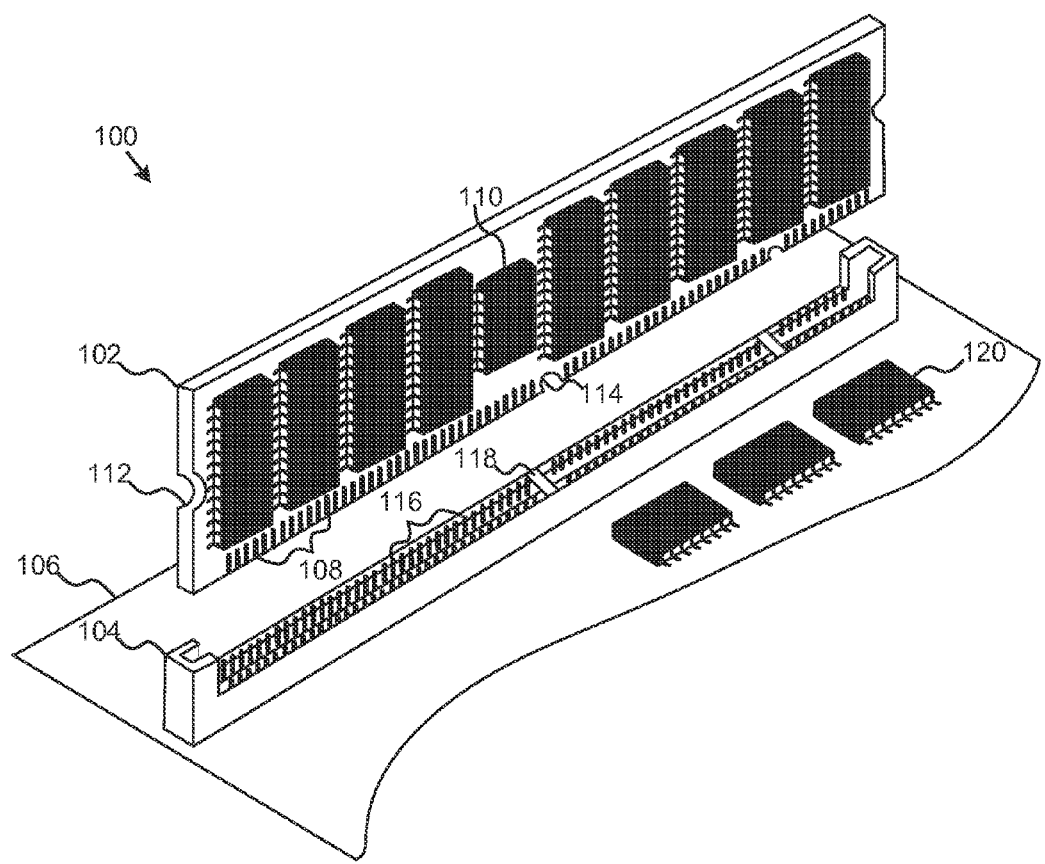
FIG. 1 is a perspective view diagram illustrating one embodiment of a pluggable circuit card and an associated socket connector.

FIG. 1 is a perspective view diagram illustrating one embodiment of a system 110 having a pluggable circuit card 102 and an associated socket connector 104. In an embodiment, the socket connector 104 may be coupled to an electronics backplane 106. The present embodiments describe methods and apparatuses for tracking the number of times a particular pluggable circuit card 102 has been inserted into a particular socket connector 104. In another embodiment, the methods may track the number of times a particular pluggable circuit card 102 has been inserted into any socket connector 104. In still other embodiments, the methods may track the number of times any pluggable circuit card 102 has been inserted into a particular socket connector 104.

In an embodiment, the electronics backplane 106 is a motherboard in an IHS 200. In general, the electronics backplane 106 provides structural support, and electrical connections between multiple circuit cards. In some embodiments, the circuit cards are pluggable circuit cards 102, such as memory cards, graphics cards, peripheral component cards, or the like. In a particular embodiment the pluggable circuit card 102 is a DIMM card. One of ordinary skill will recognize, however, that the present embodiments may be used in combination with a variety of circuit card configurations, types, and with various styles of socket connectors 104.

In the embodiment of FIG. 1, the pluggable circuit card 102 includes one or more electronic components 110 configured to communicate with external components via the one or more contacts 108 on the pluggable circuit card 102. Additionally, the pluggable circuit card may include one or more structural features for ensuring proper insertion and retention of the pluggable circuit card, such as retention notches 112 and key notches 114.

In an embodiment, the socket connector 104 may include one or more electrical contacts 116 configured interface with mating contacts 108 on the pluggable circuit card 102. In an embodiments, the electrical contacts 116 may include metal plated contact pins. The electrical contacts 116 may be plated with a thin layer of gold or other highly conductive material. Additionally, in some embodiments, the electrical contacts may be made of a resilient material configured to be depressed when the pluggable circuit card 102 is inserted into the socket connector 104. The socket connector 104 may also include one or more keyed portions 118 configured to align with mating key portions 114 of the pluggable circuit card 102. In a further embodiment, the electronics backplane 106 may include additional circuitry 120, such as on-board electronics, I/O interfaces, control circuitry, etc. Further embodiments of additional circuitry 120 are described below with relation to FIG. 4. The electronics backplane 106 may further include electrical connections or interfaces between multiple socket connectors 104 and other components of an electronic system.

Figure 2:
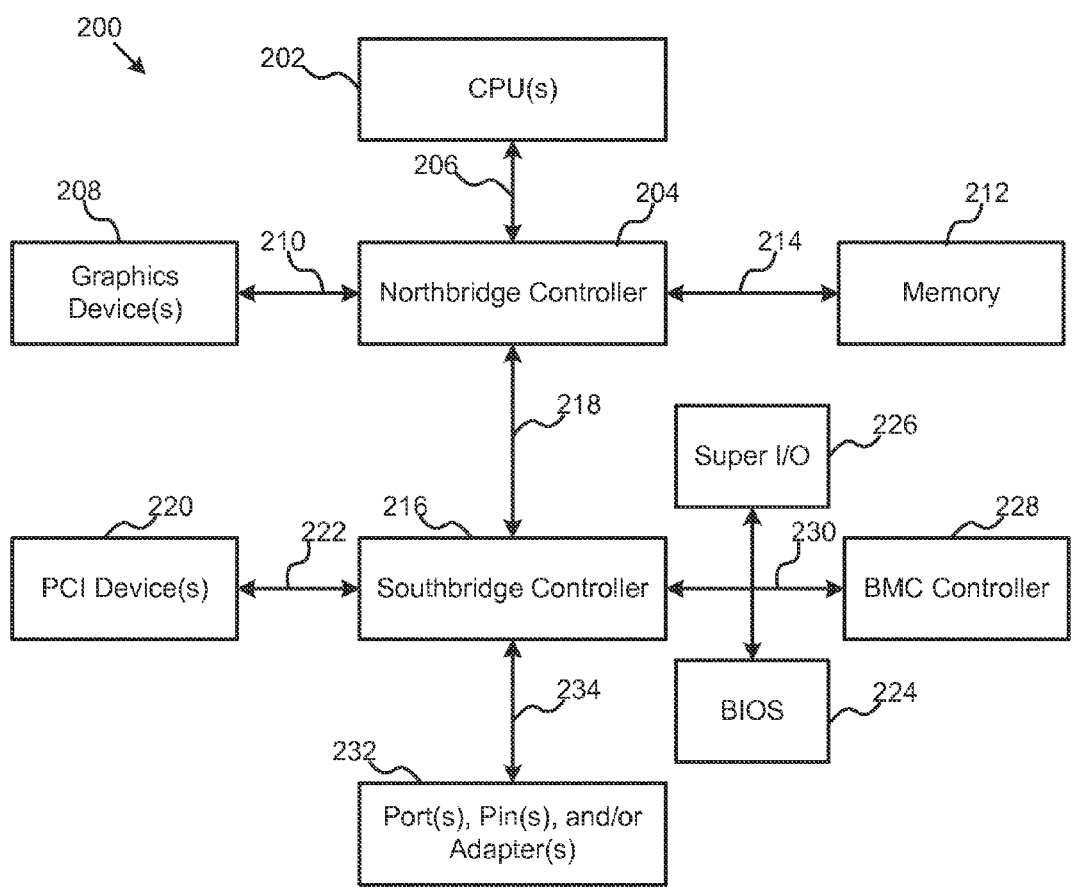
FIG. 2 is a schematic block diagram illustrating one embodiment of an IHS for circuit card insertion tracking.

FIG. 2 is a schematic block diagram illustrating one embodiment of a computing device 200 for circuit card insertion tracking. The computing device 200 is one example of a system in which pluggable circuit cards 102, connector sockets 104, and electrical backplanes 106 as illustrated in FIG. 1 may be used. As shown, computing device 200 includes one or more CPUs 202. In various embodiments, computing device 200 may be a single-processor system including one CPU 202, or a multi-processor system including two or more CPUs 202 (e.g., two, four, eight, or any other suitable number). CPU(s) 202 may include any processor capable of executing program instructions. For example, in various embodiments, CPU(s) 202 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of CPU(s) 202 may commonly, but not necessarily, implement the same ISA. In an embodiment, the electrical backplane 106 may be a motherboard configured to provide structural support, power, and electrical connectivity between the various components illustrated in FIG. 2. The electrical backplane 106 may include multiple connector sockets 104 in various configurations, configured to receive pluggable circuit cards 102, component chip packages, such as CPU chips, etc.

CPU(s) 202 are coupled to northbridge controller or chipset 204 via front-side bus 206. Northbridge controller 204 may be configured to coordinate I/O traffic between CPU(s) 202 and other components. For example, in this particular implementation, northbridge controller 204 is coupled to graphics device(s) 208 (e.g., one or more video cards or adaptors, etc.) via graphics bus 210 (e.g., an Accelerated Graphics Port or AGP bus, a Peripheral Component Interconnect or PCI bus, etc.). Northbridge controller 204 is also coupled to system memory 212 via memory bus 214. Memory 212 may be configured to store program instructions and/or data accessible by CPU(s) 202. In various embodiments, memory 212 may be implemented using any suitable memory technology, such as static RAM (SRAM), synchronous dynamic RAM (SDRAM), nonvolatile/Flash-type memory, or any other type of memory.

Northbridge controller 204 is coupled to southbridge controller or chipset 216 via internal bus 218. Generally, southbridge controller 216 may be configured to handle various of computing device 200's I/O operations, and it may provide interfaces such as, for instance, Universal Serial Bus (USB), audio, serial, parallel, Ethernet, etc., via port(s), pin(s), and/or adapter(s) 232 over bus 234. For example, southbridge controller 216 may be configured to allow data to be exchanged between computing device 200 and other devices, such as other IHSs attached to a network. In various embodiments, southbridge controller 216 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 216 may also enable connection to one or more keyboards, keypads, touch screens, scanning devices, voice or optical recognition devices, or any other devices suitable for entering or retrieving data. Multiple I/O devices may be present in computing device 200. In some embodiments, I/O devices may be separate from computing device 200 and may interact with computing device 200 through a wired or wireless connection. As shown, southbridge controller 216 is further coupled to one or more PCI devices 220 (e.g., modems, network cards, sound cards, video cards, etc.) via PCI bus 222. Southbridge controller 216 is also coupled to Basic I/O System (BIOS) 224, Super I/O Controller 226, and Baseboard Management Controller (BMC) 228 via Low Pin Count (LPC) bus 230.

BIOS 224 includes non-volatile memory having program instructions stored thereon. Those instructions may be usable CPU(s) 202 to initialize and test other hardware components and/or to load an Operating System (OS) onto computing device 200. As such, BIOS 224 may include a firmware interface that allows CPU(s) 202 to load and execute certain firmware, as described in more detail below. In some cases, such firmware may include program code that is compatible with the Unified Extensible Firmware Interface (UEFI) specification, although other types of firmware may be used.

BMC controller 228 may include non-volatile memory having program instructions stored thereon that are usable by CPU(s) 202 to enable remote management of computing device 200. For example, BMC controller 228 may enable a user to discover, configure, and manage BMC controller 228, setup configuration options, resolve and administer hardware or software problems, etc. Additionally or alternatively, BMC controller 228 may include one or more firmware volumes, each volume having one or more firmware files used by the BIOS' firmware interface to initialize and test components of computing device 200.

Super I/O Controller 226 combines interfaces for a variety of lower bandwidth or low data rate devices. Those devices may include, for example, floppy disks, parallel ports, keyboard and mouse, temperature sensor and fan speed monitoring, etc. For example, the super I/O controller 226 may be coupled to the one or more upstream sensors 206 and to the one or more downstream sensors 208.

In some cases, computing device 200 may be configured to access different types of computer-accessible media separate from memory 212. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to computing device 200 via northbridge controller 204 and/or southbridge controller 216.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that computing device 200 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 204 may be combined with southbridge controller 216, and/or be at least partially incorporated into CPU(s) 202. In other implementations, one or more of the devices or components shown in FIG. 2 may be absent, or one or more other components may be added. Accordingly, systems and methods described herein may be implemented or executed with other computer system configurations. In some cases, various elements shown in FIG. 2 may be mounted on a motherboard and protected by a chassis or the like.

One of ordinary skill will recognize that the computer system 200 of FIG. 2 is only one example of a system in which the present embodiments may be utilized. Indeed, the present embodiments may be used in various electronic devices, such as network router devices, televisions, custom telecommunications equipment for special purpose use, etc. The present embodiments are in no way limited to use with the computer system of FIG. 2.

Figure 3:
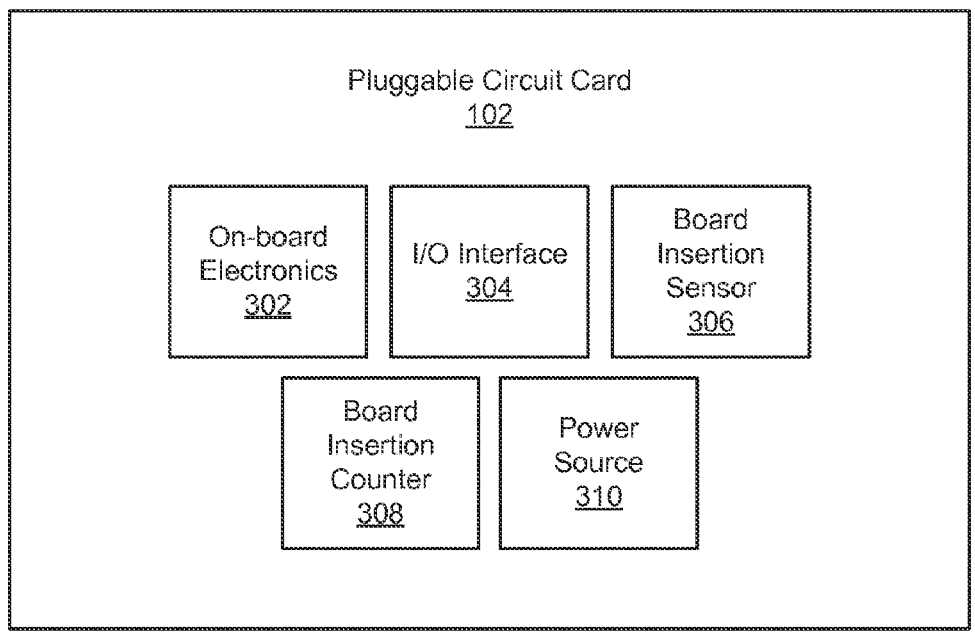
FIG. 3 is a schematic block diagram illustrating one embodiment of a pluggable circuit card for insertion tracking.

FIG. 3 is a schematic block diagram illustrating one embodiment of a pluggable circuit card 102 for insertion tracking. In an embodiment, the pluggable circuit card 102 may include on-board electronics 302. On-board electronics 302 may generally be embodied as electrical components 110 described with relation to FIG. 1. In some embodiments, on-board electronics 302 may include memory cell devices, controllers, discrete components, etc. In addition, the pluggable circuit card 102 may include an I/O interface 304. The I/O interface 304 may be configured to allow the on-board electronics to communicate with external components. The I/O interface 304 may include an I/O controller configured to run an I/O driver, and electrical connections and contacts for physically interfacing with external components. In one embodiment, the I/O interface may include contacts 108 as illustrated in FIG. 1, or a similar configuration of contacts 108.

In an embodiment, the pluggable circuit card 102 may include a board insertion sensor 306. The board insertion sensor 306 may be configured to detect when the pluggable circuit card 102 has been inserted into a socket connector 104. The board insertion sensor 306 may include a mechanical detector, such as a depressible switch or contact, an electrical detector such as an impedance detector, an inductive sensor, or the like. One of ordinary skill will recognize a variety of different sensor configurations and arrangement that may be suitable for detecting insertion of the pluggable circuit card 102 into a connector socket 104.

In one embodiment, the pluggable circuit card 102 may include a board insertion counter 308 coupled to the board insertion sensor 306. The board insertion counter 308 may be configured to increment a counter value each time the board insertion sensor 306 detects that the pluggable circuit card 102 has been inserted into a socket connector 104. The board insertion counter 308 may be included in electrical components 110 described in FIG. 1. In a further embodiment, the board insertion counter 308 may be integrated with on-board electronics 302. In still a further embodiment, the board insertion counter 308 may be a separate component of the pluggable circuit card.

The board insertion counter 308, and certain embodiments of the board insertion sensor 306 may be powered by a power source 310. In some embodiments, the power source 310 may be the main power supply (Vdd) for the on-board electronics 302. In other embodiments, the power source 310 may be an on-board battery, such as a coin-cell battery. In another embodiment, the power source 310 may include a piezo-electric element configured to convert mechanical force during insertion of the pluggable circuit card 102 into the socket connector 104 into electrical energy sufficient to increment the board insertion counter 308. Beneficially, such an embodiment may enable board insertion tracking, even when the pluggable is not powered by the main power supply for the on-board electronics. One of ordinary skill will recognize a variety of suitable power sources 310 that may be suitable for use with the present embodiments.

Figure 4:
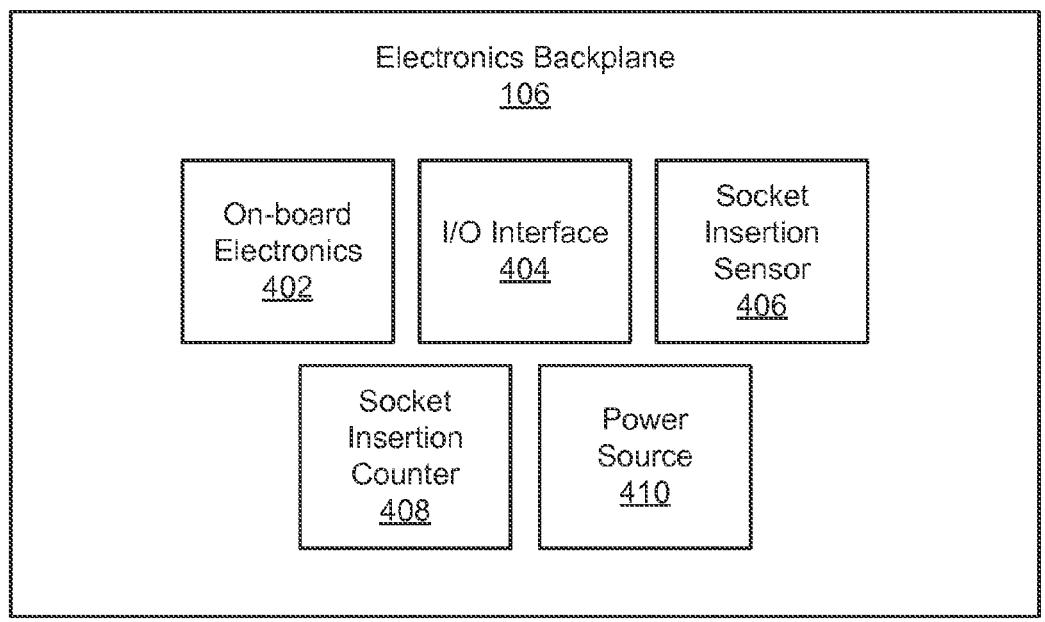
FIG. 4 is a schematic block diagram illustrating one embodiment of an electronics backplane for circuit card insertion tracking.

FIG. 4 is a schematic block diagram illustrating one embodiment of an electronics backplane 106 for circuit card insertion tracking. One of ordinary skill will recognize that the electronics backplane 106 may be any circuit card, circuit board, connector assembly, or other structure that includes a socket connector 104. In a particular embodiment, the electronics backplane 106 may be a motherboard of a computer system. In other embodiments, the electronics backplane may be a PCI interface board or other interface board configured to plug into a motherboard.

The electronics backplane 106 may also include on-board electronics 402 and an I/O interface 404. In some cases, the on-board electronics 402 may be embodied as additional circuitry 120 illustrated in FIG. 1. In an embodiment, the on-bard electronics 402 may be configured to communicate with on-board electronics 302 of the pluggable circuit card 102 via the I/O interface 404, which may include a socket connector 104. The I/O interface may additionally include controllers, conductors, and/or other components configured to facilitate communication of data to and from the pluggable circuit card 102.

In one embodiment, the electronics backplane 106 may include a socket insertion sensor 406. In some embodiments, the socket insertion sensor 406 may be a mechanical sensor configured to mechanically detect insertion of a pluggable circuit card 104 in the socket connector 104, even when the electronics backplane 106 is not powered by an external power supply. In another embodiment, the socket insertion sensor 306 may be an electro-mechanical sensor device, such as a pressure sensor, depressible contact switch, etc. In still other embodiments, the socket insertion sensor 306 may be an electrical sensor devices, such as an inductive sensor, or the like.

The socket insertion sensor 406 may be coupled to a socket insertion counter 406 configured to increment each time the socket insertion sensor 406 detects insertion of a pluggable circuit card 102 into the socket connector 104. In other embodiments, the socket insertion counter 406 may be configured to increment when removal of the pluggable circuit card 102 is detected by the socket insertion sensor 406. The socket insertion counter 406 may be an electronic counter device in some embodiments. In other embodiments, the socket insertion counter 406 may be a mechanically incrementable counter, such as a metered dial, gear sprocket, or the like. One of ordinary skill will recognize a variety of suitable counter devices that may be used according to the present embodiments.

In an embodiment, the electronics backplane 106 may include a power source 410. The power source 410 may be configured to power the socket insertion sensor 406 and/or the socket insertion counter 408. In an embodiment, the power source 410 may be the main power supply for the electronic system, which may be coupled to the electronics backplane 106. In another embodiment, the power supply 410 may be an on-board battery, such as a coin-cell battery. In other embodiments, the power supply 410 may be a mechanical power supply, such as a piezo-electric device, configured to convert mechanical energy associated with inserting the pluggable circuit card 102 into a socket connector 104 into electrical energy sufficient to power the socket insertion sensor 406 and/or the socket insertion counter 408, even when the electronics backplane is otherwise unpowered.

Figure 5A:
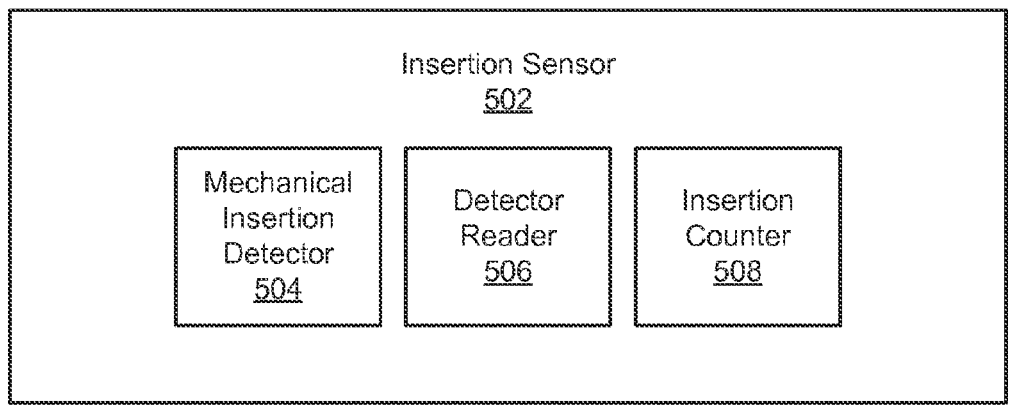
FIG. 5A is a schematic block diagram illustrating one embodiment of an insertion sensor for circuit card insertion tracking.

FIG. 5A is a schematic block diagram illustrating one embodiment of an insertion sensor 502 for circuit card insertion tracking. In an embodiment, the insertion sensor 502 may include a mechanical insertion detector 504. The mechanical insertion detector 504 may detect the insertion in response to mechanical energy associated with insertion of the pluggable circuit card 102 into the socket connector 104. Some embodiments of a mechanical insertion detector are described below with relation to FIGS. 6A-C. In an embodiment, the mechanical insertion detector 504 may detect insertion of a pluggable circuit card 102 into a socket connector 104 without requiring electrical power. The insertion sensor 502 may include a detector reader 506 configured to generate a signal or data indicating that the mechanical insertion detector 504 has detected an insertion. In an embodiment, the detector reader 506 may include a potentiometer, a contact switch, or other components capable of converting a mechanical change in the mechanical detector 504 into an electrical signal indicative of the stat of the mechanical insertion detector 504. In an embodiment, the detector reader 506 may provide a signal to the insertion counter 508. The insertion counter 508 may store a value for use by components of an electrical system to determine how many times a pluggable circuit card 102 has been plugged into and/or removed from a socket connector 104.

Figure 5B:
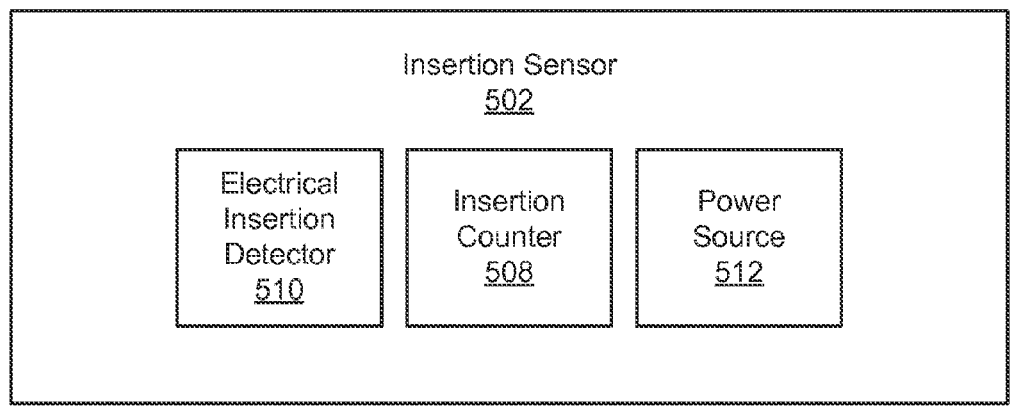
FIG. 5B is a schematic block diagram illustrating another embodiment of an insertion sensor for circuit card insertion tracking.

FIG. 5B is a schematic block diagram illustrating another embodiment of an insertion sensor 502 for circuit card insertion tracking. In the embodiment of FIG. 5B, the insertion sensor 502 may include an electrical insertion detector 510. For example, an electrical insertion detector may include an impedance-based detector for detecting a change in an electrical impedance of a structure associated with insertion or removal of a pluggable circuit card 102. In another embodiment, the electrical insertion detector 510 may include an inductive detector for detecting an change in inductance associated with one or more contacts 108 being in proximity to the inductive detector. In such embodiments, the insertion sensor 502 may include an insertion counter 508 coupled to the electrical insertion detector 510 and a power source 512 configured to power both the electrical insertion detector 510 and the insertion counter 508. In one embodiment the power source may be a dedicated coin-cell battery arranged to provide dedicated power to the insertion sensor 502.

Figure 5C:
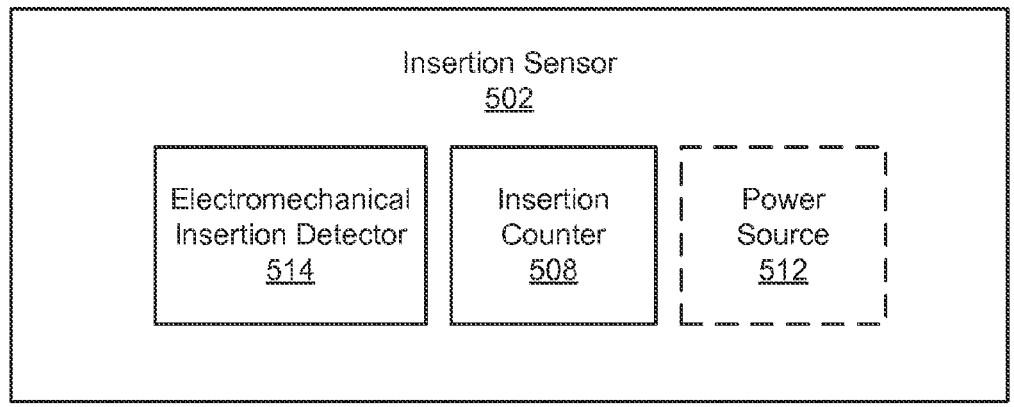
FIG. 5C is a schematic block diagram illustrating another embodiment of an insertion sensor for circuit card insertion tracking.

FIG. 5C is a schematic block diagram illustrating another embodiment of an insertion sensor 502 for circuit card insertion tracking. In an embodiment, the insertion sensor 502 may include an electromechanical insertion detector 514, which may include a hybrid of mechanical components and electrical components configured to detect insertion of a pluggable circuit card 102 into a socket connector 104. In an embodiment, the insertion sensor 502 includes an insertion counter 508 coupled to the electromechanical insertion detector 514. Optionally, the insertion sensor 502 may include a power source 512. In other embodiments, the insertion sensor 502 may leverage electrical energy generated by the electromechanical insertion detector 514 to power the insertion counter 508. For example, the electromechanical insertion detector 514 may include a piezoelectric element configured to convert mechanical pressure associated with insertion of a pluggable circuit card 102 into electrical energy for incrementing the insertion counter 508. In other embodiments, the electromechanical detector 514 may include a push-button, a plunger, etc.

One of ordinary skill will recognize that the insertion sensors 502 described with relation to FIGS. 5A-C may be used on either the pluggable circuit card 102 or an a electrical backplane 106. In other embodiments, the insertion sensor 502 may be integrated with a socket connector 104.

Figure 6A:
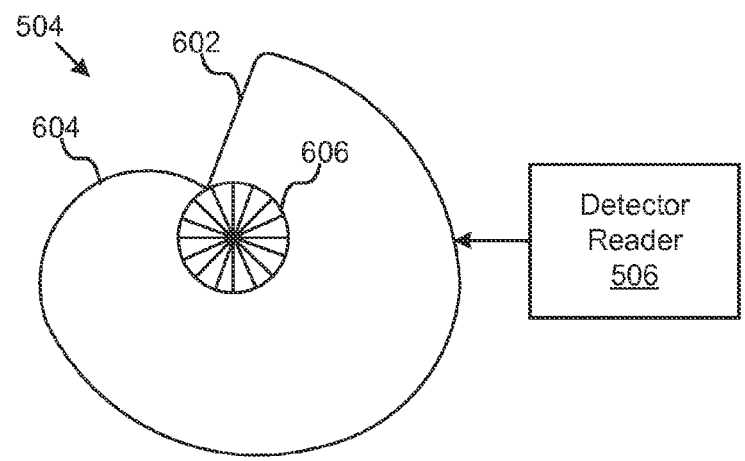
FIG. 6A is a schematic diagram illustrating one embodiment of a mechanical insertion sensor.

FIG. 6A is a schematic diagram illustrating one embodiment of a mechanical insertion sensor 504. In an embodiment, the mechanical insertion sensor 504 may be configured to rotate about an axis. The mechanical insertion sensor 504 may include a dial 602 having a spiral profile in one embodiment. The radius of from the center of the mechanical insertion sensor 504 to the outside edge 604 of the mechanical insertion sensor 504 may vary as the mechanical insertion sensor rotates about the axis. In an embodiment, mechanical insertion sensor 504 may rotate in response to a pluggable circuit card 102 insertion and/or removal from a socket connector 104. In one embodiment, the detector reader 506 may read a number of detected insertions/removals by measuring a position of the outside edge 604. Alternatively, the detector reader 506 may read mechanical grooves 606 on the dial 602. In some embodiments, pluggable circuit card 102 insertion may interact with mechanical grooves 606 to advance the dial 602 by one position.

Figure 6B:
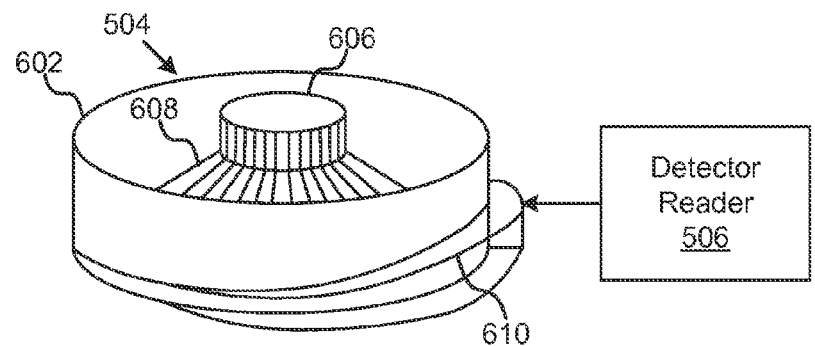
FIG. 6B is a schematic diagram illustrating another embodiment of a mechanical insertion sensor.

FIG. 6B is a schematic diagram illustrating another embodiment of a mechanical insertion sensor 504. In the embodiment of FIG. 6B, the dial 602 may also rotate about an axis, but may have a rising edge 610 configured to increase in height as the dial 602 rotates about the axis. The detector reader 506 may measure the height of the rising edge 610 to determine the count of card insertions/removals. Alternatively, the detector reader may measure mechanical grooves 608 on the top surface of the dial 602 or mechanical grooves on the side of a center meter dial 606. In some embodiments, pluggable circuit card 102 insertion may interact with mechanical grooves 606 or 608 to advance the dial 602 by one position. One of ordinary skill will recognize a variety of embodiments that may be suitable for measuring the mechanical detector 502.

Figure 6C:
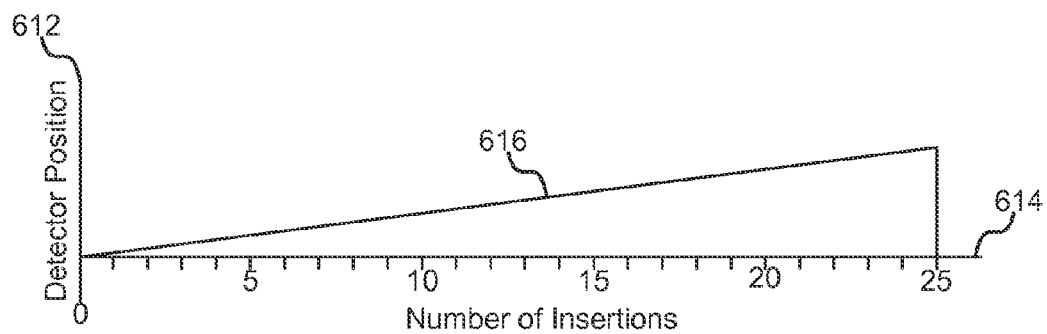
FIG. 6C is a diagram illustrating an embodiment of counting insertions from a mechanical insertion detector.

FIG. 6C is a diagram illustrating an embodiment of counting insertions from a mechanical insertion detector 504. In an embodiment, the outside edge 604 or the rising edge 610 may increase with each insertion and/or removal of a pluggable circuit card 102. The y-axis describes the detector position and the x-axis describes the number of insertions that correspond to that position. The sloped line 616 may correspond to either the number of counted insertions as detected from the position of the rising edge 610 of FIG. 6B or the outside edge 604 of FIG. 6A.

Figure 7:
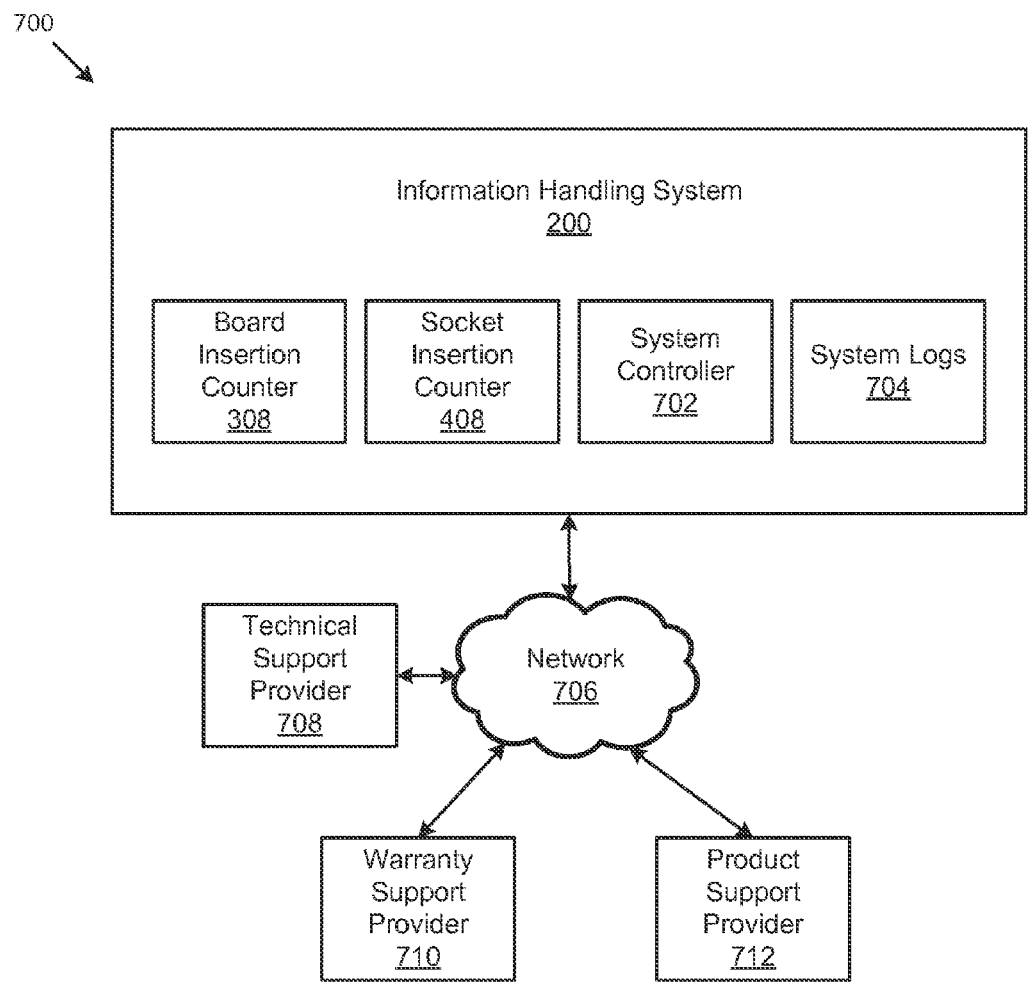
FIG. 7 is a schematic block diagram illustrating one embodiment of a system for circuit card insertion tracking.

FIG. 7 is a schematic block diagram illustrating one embodiment of a system 700 for circuit card insertion tracking. In an embodiment, the system 700 may include a computer system 200, such as the embodiment described above with relation to FIG. 2. The computer system 200 may include an electronics backplane 106, such as a motherboard, having one or more socket connectors 104. The computer system 200 may also include one or more pluggable circuit cards 102, such as a DIMM memory card for system memory 212, for example. In addition, the computer system 200 may include a board insertion counter 308 coupled to the one or more pluggable circuit cards 102 and a socket insertion counter 408 coupled to the one or more socket connectors 104.

In an embodiment, the computer system 200 may also include a system controller 702. The system controller 702 may be embodied in various implementations, such as in the system BIOS 224, the BMC controller 228, in a dedicated Application Specific Integrated Circuit (ASIC), in a software-defined module configured to be operated by a processor 202, or the like. The system controller 702 may receive data from the board insertion counter 308. Additionally, the system controller 702 may receive data from the socket insertion counter 408. In some embodiments, the system controller 702 may record the number of times a pluggable circuit card 102 has been plugged into a socket connector 104. In a further embodiment, the system controller 702 may record the number of times a specific pluggable circuit card 102 has been inserted into a specific socket connector 104. Such data may be recorded by the system controller 702 in system logs 704. In some embodiments, system logs 704 will be distributed across non-volatile storage elements on pluggable circuit card 102 and electronics backplane 106 such that each counter resides on the associated cards and backplanes. In additional embodiments, the counters may additionally be maintained elsewhere internally to computer system 200 or externally accessible by computer system 200.

In an embodiment, insertion data may be communicated by the computer system 200 over the network 706 to a technical support provider 708, such as an Information Technology (IT) specialist for a company. In another embodiment, the insertion data may be used to determine warranty eligibility for the computer system 200 for certain components of the computer system 200, such as a specific pluggable circuit card 102, by a warranty support provider 710. In still a further embodiment, a product support provider 712, such as technical support of the manufacturer of the computer system 200, may use the insertion data to diagnose potential issues related to the socket connectors 104 and the pluggable circuit cards 102.

In some embodiments, the system controller 702 may automatically notify a user of the computer system 200, a technical support provider 708, a warranty support provider 710, or a product support provider 712 in response to a number of insertions counted by either the board insertion counter 308 or the socket insertion counter 408 reaching a threshold count value. In still further embodiments, the system controller 702 may detect when a pluggable circuit card 102 is hot-plugged into a powered socket connector 104, which information may be communicated to the technical support provider 708, the warranty support provider 710, or the product support provider 712. In some embodiments, the insertion of pluggable circuit card 102 into powered socket connector 104 may be un-supported by the system or may cause immediate or latent damage to pluggable circuit card 102 or electrical backplane 106, and such detected action may be specially logged or communicated.

Figure 8:
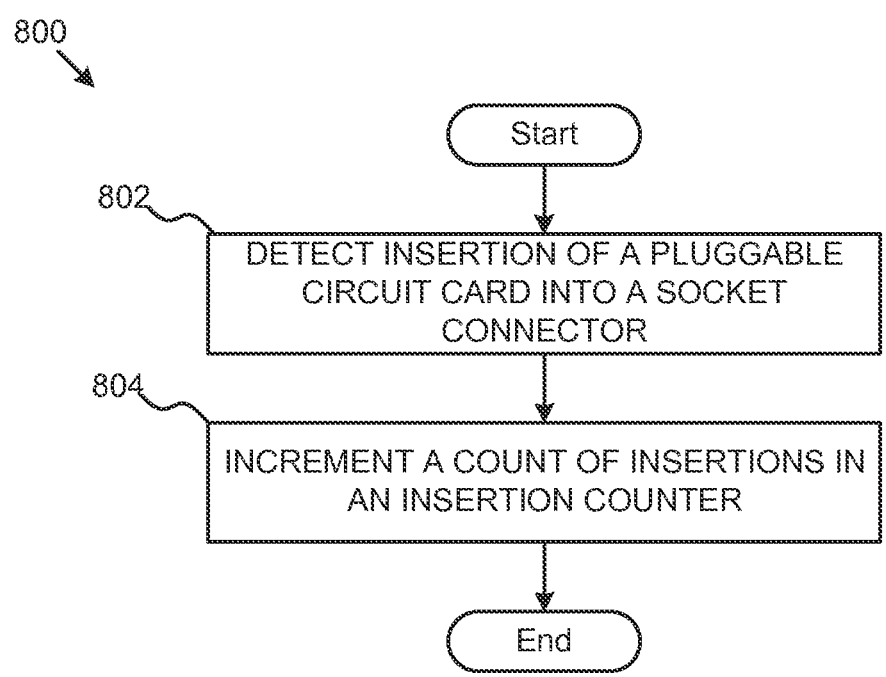
FIG. 8 is a flowchart diagram illustrating one embodiment of a method for circuit card insertion tracking.

FIG. 8 is a flowchart diagram illustrating one embodiment of a method 800 for circuit card insertion tracking. In an embodiment, the method 800 begins at block 802 with detecting insertion of a pluggable circuit card 102 into a socket connector 104. At block 804, the method includes incrementing a count of insertions in an insertion counter. In other embodiments, method 800 may be expanded to include determining if the number of insertions is close to a design limit. If the number of insertions has exceeded the design limit, the method may include logging the count, alerting the system or serviceperson that a threshold has been exceeded, etc. the examples that follow describe additional embodiments of methods which may be incorporated according to the present embodiments.

EXAMPLES

The following examples describe certain specific use cases in which the described embodiments may provide benefits. One of ordinary skill will recognize that the present embodiments are not limited only to the described use cases, but that these use cases are included merely as examples to help describe certain benefits which may be derived from the present embodiments.

In a first example, a pluggable circuit card 102 may be inserted into a new system. In an embodiment, the board insertion counter 308 tracks the number of times a pluggable circuit card 102 has powered up in a new system (i.e., the number of times a pluggable circuit card 102 has been moved around from system to system).

In an example using a DIMM card, the board insertion counter 308 may store the last N bytes of the last system serial number in the DIMM SPD EEPROM. During POST, if the last N bytes of the system serial number does not match the DIMM stored system serial number field, the board insertion counter 308 may update the DIMM field with the last N bytes of the new system serial number, increment the number of systems inserted counter field on the DIMM, and update the counter on the system board for the this DIMM socket connector 104 as shown in Table 1.

TABLE 1

Stored system information for insertion into new system.

| Bytes | Field |
|---|---|
| 1 | Number of Systems Inserted counter |
| N | Last N bytes of the system serial number (planar, riser, or mezzanine FRU) |

In an embodiment, the counter field may be initialized to 0 during supplier manufacturing, but may be zeroed at any point in which the manufacturing will still guaranty the specified durability. In this example a single byte is used to allow 255 cycles, but any size fields count be used. Care must be taken to ensure the count does not roll over beyond its maximum value. The last N bytes of the system serial number may be used to determine if during POST the DIMM has been moved. In another embodiment, the structure may be extended to include full serial number, or multiple serial numbers (last N) to allow ability to track an arbitrarily large number of unique systems.

In a second example, the pluggable circuit card 102 may be inserted into a new socket connector 104 on the same system. In an example of a DIMM card, the board insertion counter 308 may track the number of times the DIMM has powered up in a new DIMM slot within the same system.

In an embodiment, the method may include storing the last populated location within the planar or riser in the DIMM SPD EEPROM. During POST, the system may check to make sure last N bytes of stored system serial number matches system serial number. If the last populated slot does not match the current DIMM slot, the system may update the last populated slot with the current slot, increment the number of DIMM slots inserted counter on the DIMM, and update the counter on the system board for the this DIMM socket connector, as shown in Table 2.

TABLE 2

Stored system information for insertion into new socket on same system.

| Bytes | Field |
|---|---|
| 1 | Number of DIMM Slots Inserted counter |
| 1 or more | Last populated Slot (within the planar, riser, or mezzanine FRU) |

In an embodiment, the counter field may be initialized to 0 during supplier manufacturing, but may be zeroed at any point in which the manufacturing will still guaranty the specified durability. In this example a single byte is used to allow 255 cycles, but any size fields count be used. Care must be taken to ensure the count does not roll over beyond its maximum value. The last populated slot field format can include sub location info such as CPU# (0-3, 2-bits), Channel# (0-5, 3-bits), Slot # (0-2, 2-bits) for example. In an alternate embodiment, the structure may be extended to track multiple slots or all possible slots within a system, or may use a bitmap of slot locations.

In a third example, the pluggable circuit card 102 is inserted while the socket connector 104 is in a Powered-On state. While this is generally not supposed to occur when following proper service procedures, it is believed that it is common practice in the field, and can result in damage or degraded operation of the pluggable circuit card 102.

In an example involving a DIMM, the system may track the number of times a DIMM has been hot-plugged into a powered up DIMM slot. Once VDDSPD power (Vaux) is On a polling loop to check for DIMM presence may be started. The polling loop may be accomplished using SPD EEPROM reads over SMBus, or other methods. Polling may only be in the seconds or 10s of seconds or less, in one embodiment.

If a new DIMM is found to respond, then the system may update the DIMM Hot Plugged counter on the DIMM to track the appropriate hot plug type (main memory power was On, or just VDDPSD/VAUX was on, at time of hot plug), and update the counter on the system board for the this DIMM socket connector, as shown in Table 3.

TABLE 3

Stored system information for insertion into powered socket.

| Bytes | Field |
|---|---|
| 1 | DIMM Hot Plugged counter for Main Power (VDD, VPP, VTT, +12 v) |
| 1 | DIMM Hot Plugged counter for Aux Power (VDDSPD) |

The counter fields may be initialized to 0 during supplier manufacturing, but may be zeroed at any point in which the manufacturing will still guaranty the specified Durability. In this example a single byte is used to allow 255 cycles, but any size fields count be used. Care must be taken to ensure the count does not roll over beyond its maximum value.

In a fourth example, the pluggable circuit card 102 may be inserted while the socket connector 104 is unpowered. In a first embodiment, a coin cell on system board charges a capacitor to a few mA. Every once in a while, a low power microcontroller wakes and uses the stored capacitor energy to scan the DIMMs. The Active/Sleep ratio may be around 1000:1 time so as to not drain the coin cell battery. In an embodiment involving a DIMM, DIMM presence detect could be performed by an SMBus read, in one embodiment.

In a second embodiment, the act of inserting a DIMM into a socket connector may, through a variety of mechanical means, trigger an encapsulated piezoelectric spark which generates enough power for a lower power sensor and/or microprocessor to wake, count the event, and go back to sleep. Examples for the spark energy are similar to a cigarette lighter, or thermostat or push-button switch. Once the system powers on, the BIOS 224 or system management element 228 may read the sensors and update any per DIMM or per system board socket counters as appropriate.

In one embodiment a small push-button switch on is mounted on the DIMM, pointed down, such that when a DIMM is inserted the push-button is pushed in, creating the energy for an on-DIMM circuit to determine if the DIMM should count the event.

One such sensor device is an inductance to digital converter. Inductive sensing is a contact-less, short-range sensing technology that enables low-cost, high-resolution (sub-micron) sensing of conductive targets. Using a coil which can be created on a PCB as a sensing element, an inductance to digital converter enables ultra-low cost system solutions across many applications and products.

Some advantages of inductive sensing include: that the sensor does not require magnets which can be costly, heavy, and may interfere with onboard electronics, the inductive sensors are reliable because they are contactless, inductive sensors are generally insensitive to environmental contaminants, an inductive sensor has sub-micron resolution and is independent of temperature with proper coil system design, and the inductive sensors are low-cost. Other sensor approaches that may be used on a DIMM and socket connector include: distance measurement, linear position sensing, and gear tooth counting.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
    detecting insertion of a pluggable circuit card into a socket connector using a mechanical detection device configured to rotate about an axis, wherein the mechanical detection device has an outside edge with a radius that varies in length, wherein the mechanical detection device is configured to rotate around the axis in response to the pluggable insertion card being inserted into the socket connector, and wherein the mechanical detection device includes a detector configured to detect the insertion by measuring a change in the radius of the outside edge; and
    incrementing a count of insertions in an insertion counter.

2. The method of claim 1, further comprising detecting insertion of the pluggable circuit card into the socket connector without external power being provided to either the pluggable circuit card or the socket connector.

3. The method of claim 1, further comprising detecting that the socket connector is powered at the time that the pluggable circuit card is inserted into the socket connector.

4. The method of claim 1, further comprising recording an identifier of the pluggable circuit card inserted into the socket connector.

5. The method of claim 1, further comprising logging data associated with insertion of the pluggable circuit card into the socket connector in a system log.

6. The method of claim 1, further comprising communicating data associated with insertion of the pluggable circuit card into the socket connector to a third party.

7. An Information Handling System (IHS), comprising:
    an insertion detector configured to detect insertion of a pluggable circuit card into a socket connector, wherein the insertion detector includes a mechanical detection device configured to rotate around an axis, wherein the mechanical detection device has an outside edge with a radius that varies in length, wherein the mechanical detection device is configured to rotate around the axis in response to the pluggable circuit card being inserted into the socket connector, and wherein the mechanical detection device includes a detector configured to detect the insertion by measuring a change in the radius of the outside edge; and
    an insertion counter coupled to the insertion detector and configured to increment a count of insertions.

8. The IHS of claim 7, wherein the insertion detector is further configured to detect insertion of the pluggable circuit card into the socket connector without external power being provided to either the pluggable circuit card or the socket connector.

9. The IHS of claim 7, wherein the insertion detector is further configured to detect that the socket connector is powered at the time that the pluggable circuit card is inserted into the socket connector.

10. The IHS of claim 7, wherein the insertion counter is further configured to record an identifier of the pluggable circuit card inserted into the socket connector.

11. The IHS of claim 7, further comprising a system controller configured to log data associated with insertion of the pluggable circuit card into the socket connector in a system log.

12. The IHS of claim 7, further comprising a system controller configured to communicate data associated with insertion of the pluggable circuit card into the socket connector to a third party.

13. A method, comprising:
  detecting insertion of a pluggable circuit card into a socket connector using a mechanical detection device configured to rotate about an axis, wherein the mechanical detection device has an outside edge that varies in height, wherein the mechanical detection device is configured to rotate around the axis in response to the pluggable insertion card being inserted into the socket connector, and wherein the mechanical detection device includes a detector configured to detect the insertion by measuring a change in the height of the outside edge; and
  incrementing a count of insertions in an insertion counter.

14. An Information Handling System (IHS), comprising:
  an insertion detector configured to detect insertion of a pluggable circuit card into a socket connector, wherein the insertion detector includes a mechanical detection device configured to rotate around an axis, wherein the mechanical detection device has an outside edge that varies in height, wherein the mechanical detection device is configured to rotate around the axis in response to the pluggable circuit card being inserted into the socket connector, and wherein the mechanical detection device includes a detector configured to detect the insertion by measuring a change in the height of the outside edge; and
  an insertion counter coupled to the insertion detector and configured to increment a count of insertions.

* * * * *